(12) United States Patent
Murauskas et al.

(10) Patent No.: US 12,184,614 B2
(45) Date of Patent: *Dec. 31, 2024

(54) PERFORMANCE-BASED PARALLEL TUNNELING OF VIRTUAL PRIVATE NETWORK SERVERS

(71) Applicant: UAB 360 IT, Vilnius (LT)

(72) Inventors: Gytis Murauskas, Vilnius (LT); Zenonas Funka, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,047

(22) Filed: Jun. 5, 2023

(65) Prior Publication Data
US 2024/0396875 A1 Nov. 28, 2024

Related U.S. Application Data

(63) Continuation of application No. 18/200,952, filed on May 23, 2023.

(51) Int. Cl.
*H04L 9/40* (2022.01)

(52) U.S. Cl.
CPC ...... *H04L 63/0272* (2013.01); *H04L 63/0428* (2013.01)

(58) Field of Classification Search
CPC .............. H04L 63/0272; H04L 63/0428
See application file for complete search history.

(56) References Cited

U.S. PATENT DOCUMENTS

| 11,184,328 B1 | 11/2021 | Hyder et al. |
| 11,356,419 B1 | 6/2022 | Nosalis et al. |
| 2013/0205025 A1* | 8/2013 | Shamsee ............... H04L 45/12 709/225 |
| 2017/0171156 A1* | 6/2017 | Schultz ............... H04L 63/0414 |
| 2022/0103523 A1* | 3/2022 | Starr ................ H04L 63/0272 |

* cited by examiner

*Primary Examiner* — Noura Zoubair
(74) *Attorney, Agent, or Firm* — The Pattani Law Group

(57) ABSTRACT

A VPN infrastructure device, configured to receive a connection request for requesting VPN services; determine first and second VPN protocols that are available for providing the VPN services, the first VPN protocol being different from the second VPN protocol; determine a list indicating a first plurality of VPN servers configured to utilize the first VPN protocol and a second plurality of VPN servers configured to utilize the second VPN protocol; transmit the list indicating the first and second plurality of VPN servers; and enable a first VPN server from among the first plurality of VPN servers and a second VPN server from among the second plurality of VPN servers to provide, at substantially the same time, the VPN services to the user device, the first VPN server utilizing the first VPN protocol and the second VPN server utilizing the second VPN protocol is disclosed. Various other aspects are contemplated.

20 Claims, 7 Drawing Sheets

PERFORMANCE-BASED PARALLEL TUNNELING OF VIRTUAL PRIVATE NETWORK SERVERS

CROSS REFERENCE

This application is a continuation of U.S. Non-Provisional patent application Ser. No. 18/200,952, filed on May 23, 2023, and titled "PERFORMANCE-BASED PARALLEL TUNNELING OF VIRTUAL PRIVATE NETWORK SERVERS," the entire contents of which are incorporated herein by reference.

FIELD OF DISCLOSURE

Aspects of the present disclosure generally relate to a virtual private network (VPN), and more particularly to performance-based parallel tunneling of VPN servers in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded/encrypted, unreadable format with help of an encryption algorithm. Decryption may be associated with changing the data from being in the encoded/encrypted, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target (e.g., via the Internet). Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may include randomly generated strings of bits. Each key may be generated to be unique. A length of an encryption key may be given by a number of the randomly generated string bits, and the longer the length of the encryption key, the better (e.g., stronger) is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols. The VPN protocols may be different from network encapsulation or tunneling protocols.

SUMMARY

In one aspect, the present disclosure contemplates a method including determining, by a VPN infrastructure device, a first VPN protocol and a second VPN protocol that are available for providing VPN services to a user device, the first VPN protocol being different from the second VPN protocol; transmitting, by the VPN infrastructure device to the user device, a list indicating a first plurality of VPN servers configured to utilize the first VPN protocol and a second plurality of VPN servers configured to utilize the second VPN protocol; and establishing, by the user device at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol.

In another aspect, the present disclosure contemplates a system comprising a virtual private network (VPN) infrastructure device configured to enable provision of VPN services; and a user device configured to receive the VPN services, wherein the VPN infrastructure device is configured to determine a first VPN protocol and a second VPN protocol that are available for providing the VPN services to the user device, the first VPN protocol being different from the second VPN protocol, the VPN infrastructure device is configured to transmit, to the user device, a list indicating a first plurality of VPN servers configured to utilize the first VPN protocol and a second plurality of VPN servers configured to utilize the second VPN protocol, and the user device is configured to establish, at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol.

In another aspect, the present disclosure contemplates a non-transitory computer readable medium storing instructions, which when executed by processors associated with a virtual private network (VPN) infrastructure device and a user device, configure: the VPN infrastructure device to: determine a first VPN protocol and a second VPN protocol that are available for providing the VPN services to the user device, the first VPN protocol being different from the second VPN protocol; and transmit, to the user device, a list indicating a first plurality of VPN servers configured to utilize the first VPN protocol and a second plurality of VPN servers configured to utilize the second VPN protocol, and the user device to: establish, at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for case of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
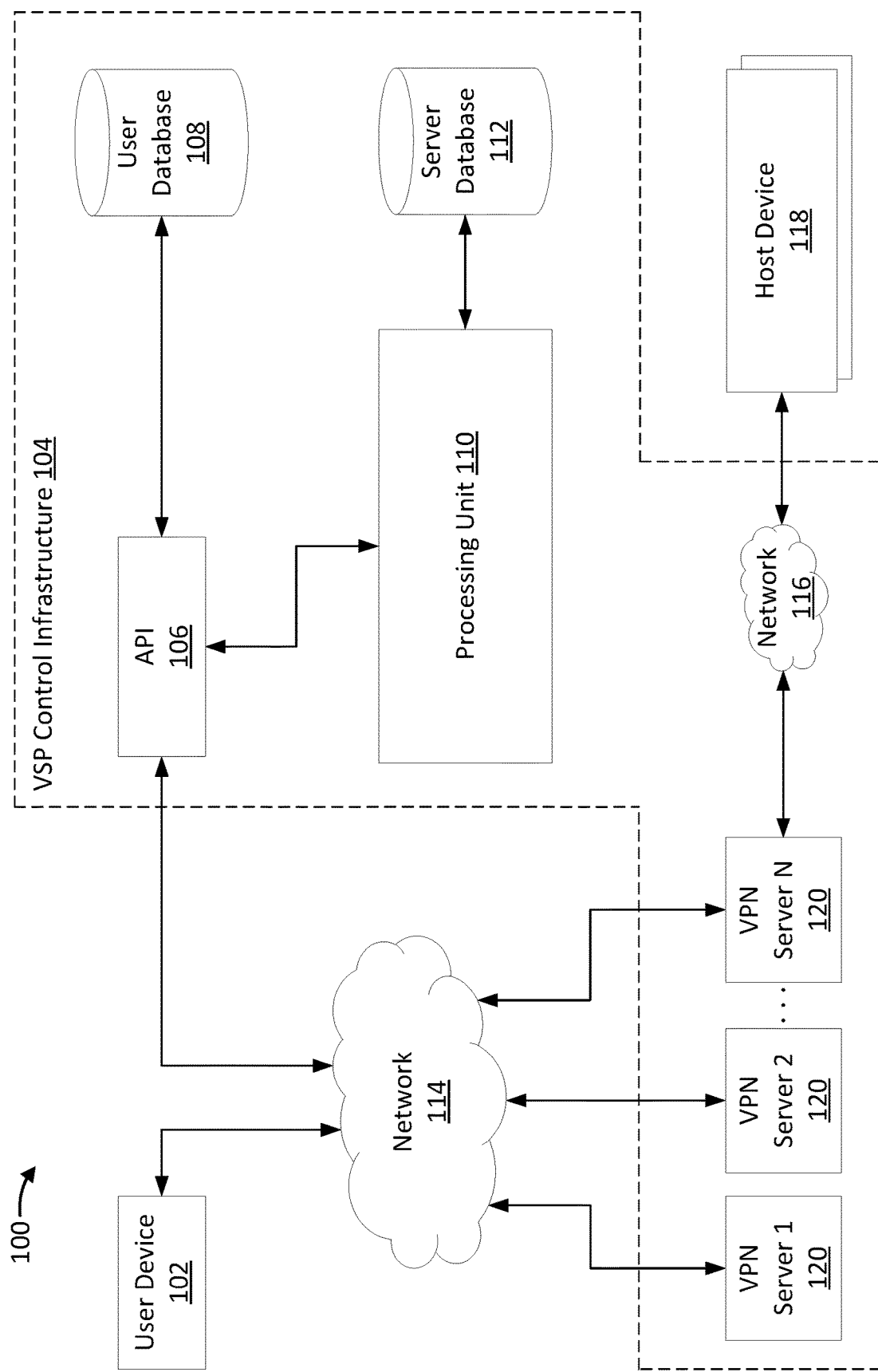

FIG. 1 is an illustration of an example system associated with performance-based parallel tunneling of VPN servers, according to various aspects of the present disclosure.

Figure 2:
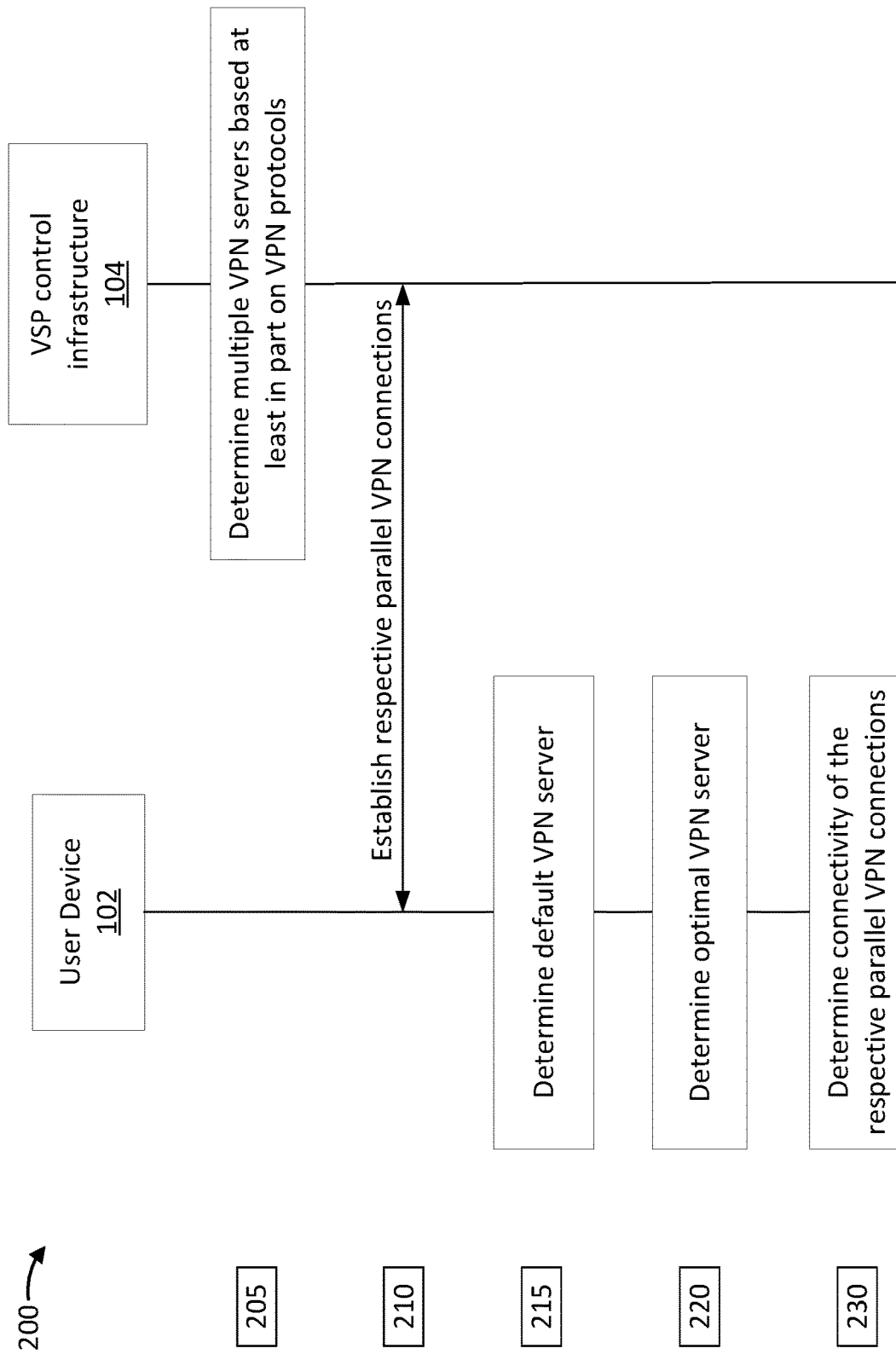

FIG. 2 is an illustration of an example flow associated with performance-based parallel tunneling of VPN servers, according to various aspects of the present disclosure.

Figure 3:
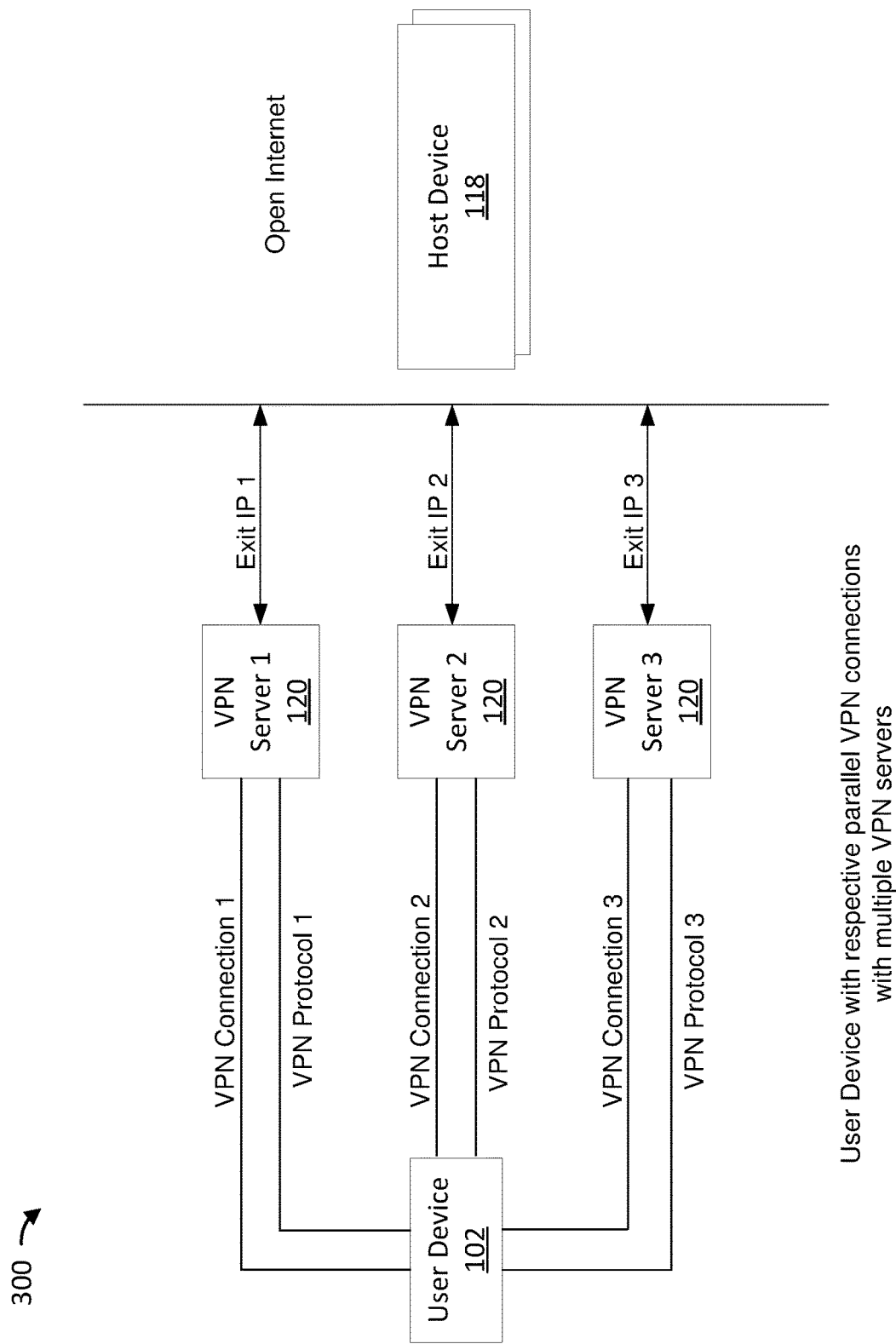

FIG. 3 is an illustration of an example associated with performance-based parallel tunneling of VPN servers, according to various aspects of the present disclosure.

Figure 4:
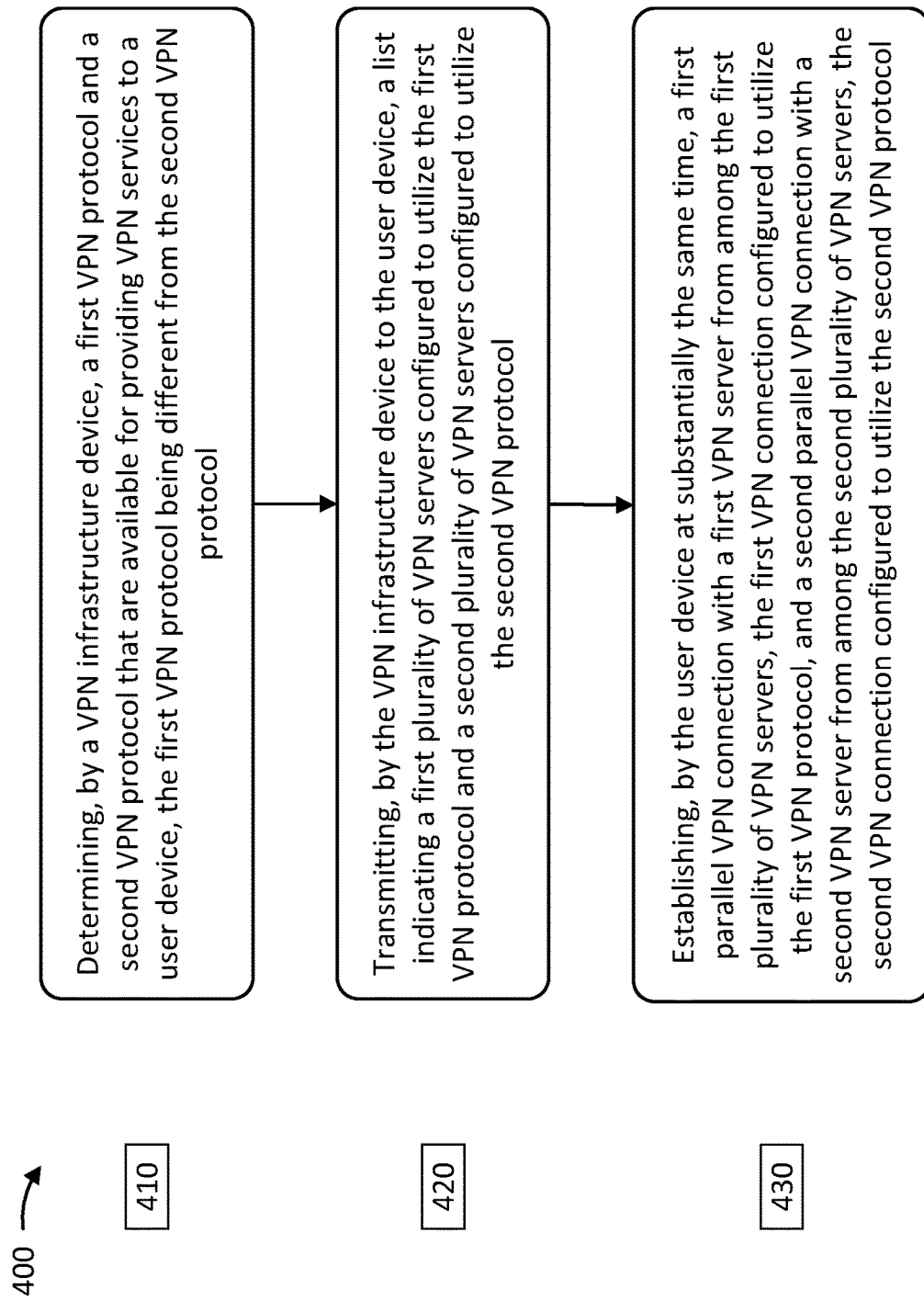

FIG. 4 is an illustration of an example process associated with performance-based parallel tunneling of VPN servers, according to various aspects of the present disclosure.

Figure 5:
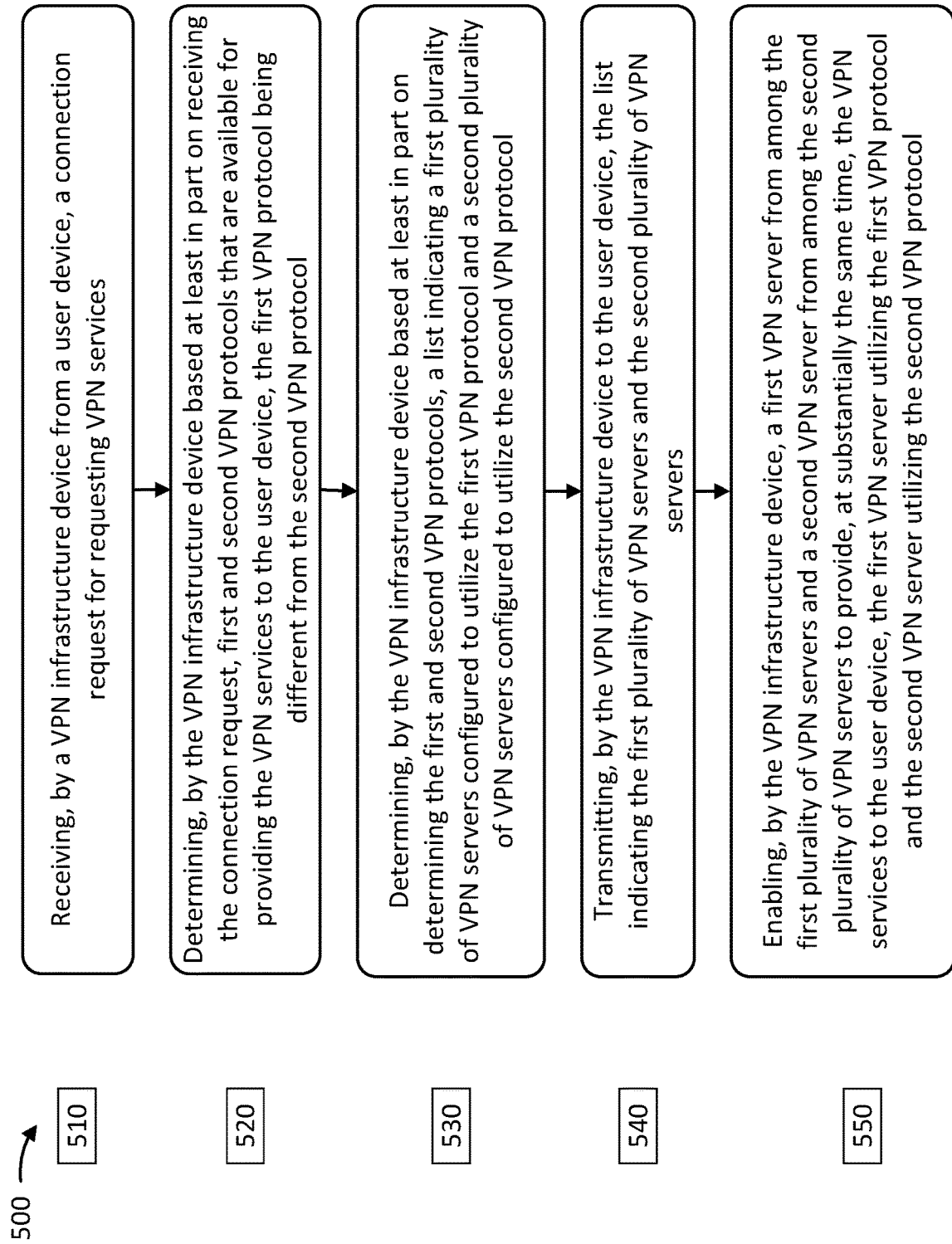

FIG. 5 is an illustration of an example process associated with performance-based parallel tunneling of VPN servers, according to various aspects of the present disclosure.

Figure 6:
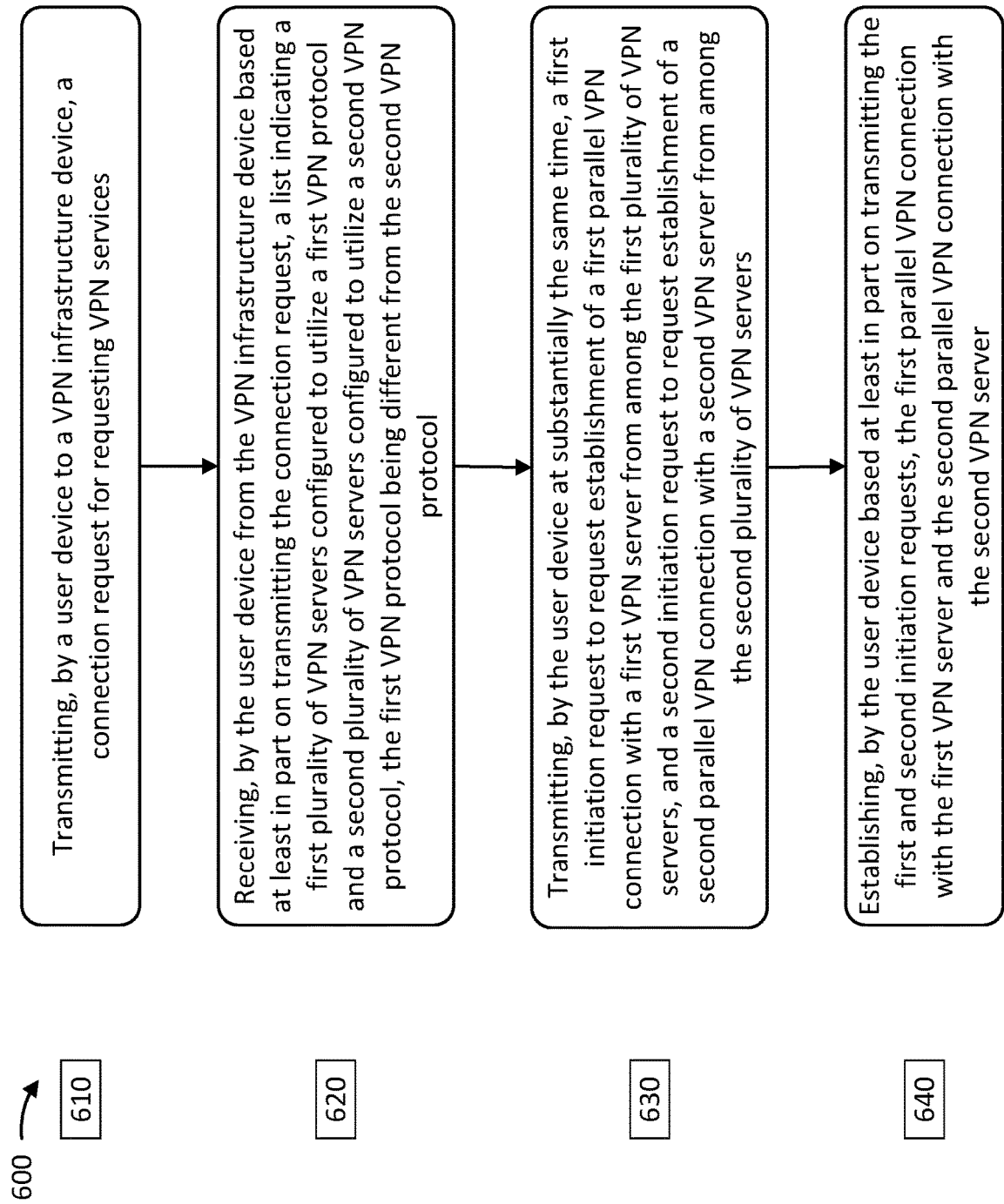

FIG. 6 is an illustration of an example process associated with performance-based parallel tunneling of VPN servers, according to various aspects of the present disclosure.

Figure 7:
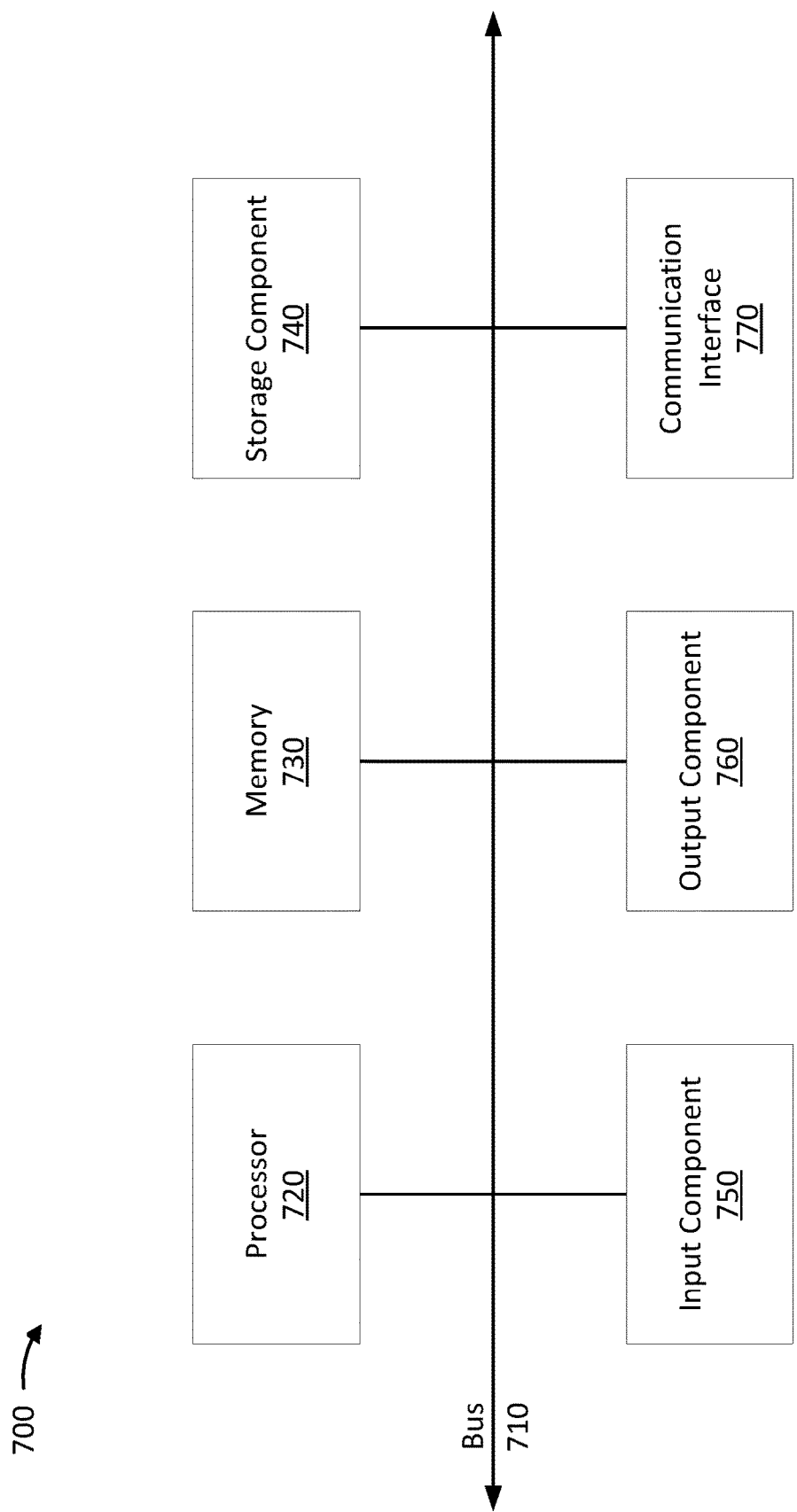

FIG. 7 is an illustration of example devices associated with performance-based parallel tunneling of VPN servers, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with performance-based parallel tunneling of VPN servers, according to various aspects of the present disclosure. Example 100 shows an architectural depiction of components included in system 100. In some aspects, the components may include a user device 102 capable of communicating with a VPN service provider (VSP) control infrastructure 104 and/or with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database and a testing module (not shown) to communicate with the one or more VPN servers 120 over the network 114. The processing unit 110 may be capable of configuring and controlling operation of the one or more VPN servers 120. The VPN servers 120 may be configured to communicate with one or more host devices to, for example, request and retrieve data of interest. Further, as shown in FIG. 1, the VPN servers 120 may be configured to communicate with one or more secondary servers 118 or routing of requests for data of interest received from the user device 102. The VPN servers 120 may also be configured to communicate with an authentication server (not shown) over the network. The processing unit 110 may be capable of configuring and controlling operation of the authentication server. In some aspects, the network 116 may be similar to the network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as smart home appliances, smart home security systems, autonomous vehicles, smart health monitors, smart factory equipment, wireless inventory trackers, biometric cyber security scanners, or the like.

The network 114 and/or the network 116 may be any digital telecommunication network that permits several nodes to share and access resources. In some aspects, the network 114 and/or the network 116 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authorized user. In yet another example, the credentials may be associated with additional factors such as knowledge, possession, inheritance, or the like. Knowledge factors may include items (e.g., pin numbers, one time password (OTP), etc.) that an authorized user may be expected to know. Possession factors may include items (e.g., smart card, etc.) that an authorized user may be expected to possess at a time associated with the authentication. Inherent factors may include biometric items (e.g., fingerprint scans, retina scans, iris scans, or the like) that may be inherent traits of an authorized user. The API 106 may provide the received credentials to the user database 108 for verification. In some aspects, the API 106 may provide the received credentials in encrypted form based at least in part on a type of credential. For instance, the API 106 may provide the inherent factors in encrypted form.

The user database 108 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes associated with authorized users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection with one or more optimal VPN servers 120. The processing unit 110 included in the VSP control infrastructure may be configured to determine/identify a single VPN server 120 as an optimal server or a list of VPN servers as multiple optimal VPN servers. The processing unit 110 may utilize the API 106 to transmit an entry IP address of the optimal VPN server to the user device 102. In some aspects, the processing unit 110 may be configured to determine/identify a list of multiple optimal VPN servers. In this case, the processing unit 110 may utilize the API 106 to transmit respective entry IP addresses of the multiple optimal VPN servers 120 to the user device 102.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine/identify the single VPN server 120 or the multiple VPN servers 120. In one example, the processing unit 110 may determine the single VPN server 120 with the lowest server penalty score as the optimal VPN server 120. In another example, the processing unit 110 may determine the list of multiple VPN servers 120 by including, for example, three (or any other number) VPN servers 120 with the three lowest server penalty scores.

The user device 102 may transmit to the single (e.g., optimal) VPN server 120 an initiation request to establish a VPN connection (e.g., an encrypted tunnel) with the optimal VPN server 120. The optimal VPN server 120 with which the user device establishes the encrypted tunnel may be referred to as a primary VPN server or an entry VPN server. Based at least in part on receiving the initiation request, the optimal VPN server 120 may conduct a VPN authentication with an authentication server (not shown) to authenticate the user device 102 as a device that is authorized to receive the VPN services. When the VPN authentication is successful, the optimal VPN server 120 may proceed to establish the VPN connection and to provide the VPN services to the user device 102. Alternatively, when the VPN authentication fails, the optimal VPN server 120 may refrain from establishing the VPN connection and from providing the VPN services to the user device 102. In some aspects, the optimal VPN server 120 may communicate with the user device 102 to obtain additional information to authenticate the user device 102.

In some aspects, the user device 102 may, at substantially the same time, transmit to the multiple optimal VPN servers 120 respective initiation requests to establish respective parallel VPN connections (e.g., respective encrypted tunnels) with the multiple VPN servers 120. Based at least in part on receiving the respective initiation requests, the multiple VPN servers 120 may conduct respective VPN authentications with one or more authentication servers (not shown) to authenticate the user device 102 as a device that is authorized to receive the VPN services. When the respective VPN authentications are successful, the multiple VPN servers 120 may proceed to establish the respective parallel VPN connections and to provide the VPN services to the user device 102. Alternatively, when the respective VPN authentications fail, the multiple VPN servers 120 may refrain from establishing the respective parallel VPN connections and from providing the VPN services to the user device 102. In some aspects, one or more of the multiple VPN servers 120 may communicate with the user device 102 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server may include a piece of physical or virtual computer hardware and/or software capable of securely communicating with one or more VPN servers 120 for provision of authentication services.

The one or more host devices 118 may include a type of server that hosts or houses websites and/or related data, applications, and/or services. The one or more host devices 118 may be a remotely accessible Internet server with complete Web server functionality and resources. In some aspects, the one or more host devices 118 may be referred to as a Web hosting server.

One or more components (e.g., API 106, user database 108, processing unit 110, server database 112, network 114, 116, and/or VPN server 120) included in the VSP control infrastructure 104 and/or one or more components (e.g., processing unit, memory, communication interface, etc.) included in the user device 102 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A user device may seek to obtain VPN services from a VSP control infrastructure. Based at least in part on authentication of the user device, the VSP control infrastructure may select a VPN server (e.g., optimal VPN server) to provide the VPN services to the user device. The VSP control infrastructure may provide the user device with an entry IP address associated with the VPN server. The user device may utilize the entry IP address to communicate and establish a VPN connection (e.g., encrypted tunnel) with the VPN server. In some aspects, the user device and the VPN server may select a default VPN protocol to be utilized. Based at least in part on the VPN connection being established, the user device and the VPN server may utilize the default VPN protocol to communicate in connection with the VPN services.

Selection of the default VPN protocol having a default configuration for utilization during the established VPN connection may not be optimal. In an example, a set-up process associated with setting up OpenVPN VPN protocol to allow the user device to use TCP communication or UDP communication may involve a threshold amount of complexity and may consume a threshold amount of user device resources (e.g., storage resources, processing resources, etc.), which the user device may not have available. In another example, although IKEv2 may allow the user device and the VPN server to establish a fast and secure VPN connection while the user device moves from one Internet connection to another, IKEv2 may not be optimal for a plurality of operating systems such as, for example, the iOS operating system, the Mac operating system, the Android operating system, or the like that the user device may utilize to operate. As such, the user device may have to expend resources (e.g., storage resources, processing resources, etc.) to configure IKEv2, which resources the user device may not have available. In yet another example, although Wireguard has a lean architecture and may enable faster VPN connections, Wireguard may fail to provide the user device with adequate anonymity and to adequately mitigate private information associated with the user device becoming compromised.

Because the default VPN protocol may not be optimal, the user device may fail to adequately receive the VPN services from the VPN server during the established VPN connection. As a result, the user device may have to terminate the established VPN connection and re-establish one or more new VPN connections while hoping to utilize an optimal VPN protocol. Such terminating of the established VPN connection and establishing of the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Additionally, a delay may be introduced in providing the VPN services to the user device.

Additionally, in some cases, the VPN server may fail to remain optimal for providing the VPN services to the user device. In an example, the VPN server may become overloaded with a threshold amount of user devices establishing VPN connections with the VPN server, thereby having reduced bandwidth to provide the VPN services to the user device. In another example, based at least in part on a change in a condition (e.g., location) associated with the user device, the user device may change a technology utilized (e.g., changing from utilizing stationary technology to mobile technology or vice versa) by the user device to access a network (e.g., Internet). In this case, the VPN server may no longer remain optimal for providing the VPN services to the user device. In some cases, the VPN server may become unavailable while providing the VPN services. In an example, the VPN server may go out of service due to a malfunction. In another example, the VPN server may go out of service for having to undergo maintenance. Additionally, in some cases based at least in part on the VPN protocol and/or the VPN server not remaining optimal, some VPN features such as, for example, threat protection, advertisement blocking, etc. may not be adequately provided.

In such cases, to continue to receive the VPN services and/or to optimally receive the VPN services, the user device may terminate the established VPN connection with the VPN server and establish a new VPN connection with a new VPN server. Terminating the established VPN connection, establishing the new VPN connection with the new VPN server, and again requesting/obtaining the data of interest may inefficiently consume user device resources (e.g., processing resources, memory resources, power consumption resources, battery life, or the like) and VPN resources (computational resources, network bandwidth, management resources, processing resources, memory resources, or the like) that may otherwise be used to perform suitable tasks associated with the VPN.

Various aspects of systems and techniques discussed in the present disclosure enable performance-based parallel tunneling of VPN servers in a VPN. In some aspects, a VSP control infrastructure may select and configure VPN servers to provide VPN services to a user device. Based at least in part on receiving a connection request for the VPN services from the user device, the VSP control infrastructure may select multiple VPN servers for providing the VPN services. Selection of the multiple VPN servers may be based at least in part on one or more VPN protocols. Such VPN protocols may include, for example, Wireguard protocol, OpenVPN (UDP or TCP) protocol, IKEv2 protocol, and/or a modified version of one or more of these VPN protocols. Further, the VSP control infrastructure may enable the user device to establish multiple respective VPN connections (e.g., parallel encrypted tunnels) with the multiple VPN servers such that the user device may establish, at substantially the same time, a first parallel VPN connection with a first VPN server that utilizes a first VPN protocol, a second parallel VPN connection with a second VPN server that utilizes a second VPN protocol, a third parallel VPN connection with a third VPN server that utilizes a third VPN protocol, and so on. The first, second, and third VPN protocols may be different with respect to each other. As a result, the user device may receive, at substantially the same time, the VPN services from the multiple VPN servers utilizing different VPN protocols. In some aspects, a VPN server, from among the multiple VPN servers, to first establish a parallel VPN connection with the user device may be determined as a default VPN server. The user device may initially transmit data requests to the default VPN server. Once all multiple parallel VPN connections are established, the user device may determine, in real time, which of the multiple VPN servers is optimal (e.g., optimal VPN server) for providing the VPN services to the user device. The user device may determine the optimal VPN server based at least in part on a VPN protocol that is predetermined to be optimal for current (e.g., real-time) conditions associated with the user device. When the current optimal VPN server is different from the default VPN server, the user device may start requesting VPN services from the optimal VPN server instead of from the default VPN server (or a previous optimal VPN server). The user device may determine the optimal VPN server periodically. In this way, by establishing multiple parallel VPN connections (e.g., parallel encrypted tunnels) with the multiple VPN servers based at least in part on VPN protocols (and other factors) and/or by periodically determining the optimal VPN server based at least in part on the optimal VPN protocol (and other factors), the user device may continue to optimally receive the VPN services even when conditions associated with the user device change without terminating established VPN connections and/or without establishing new VPN connections. As a result, efficient utilization of user device resources (e.g., processing resources, memory resources, power consumption resources, battery life, or the like) and VPN resources (computational resources, network bandwidth, management resources, processing resources, memory resources, or the like) may be enabled.

In some aspects, a virtual private network (VPN) infrastructure device may enable provision of VPN services; and a user device may receive the VPN services, wherein the VPN infrastructure device is configured to determine a first VPN protocol and a second VPN protocol that are available for providing the VPN services to the user device, the first VPN protocol being different from the second VPN protocol, the VPN infrastructure device is configured to transmit, to the user device, a list indicating a first plurality of VPN servers configured to utilize the first VPN protocol and a second plurality of VPN servers configured to utilize the second VPN protocol, and the user device is configured to establish, at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol.

FIG. 2 is an illustration of an example flow 200 associated with performance-based parallel tunneling of VPN servers in a VPN, according to various aspects of the present disclosure. Example flow 200 includes a user device 102 in communication with a VSP control infrastructure 104 responsible for configuring multiple VPN servers 120 to provide VPN services to the user device 102. In some aspects, the user device 102 may communicate with the VSP control infrastructure 104 and/or multiple VPN servers 120 over a network (e.g., network 114). In some aspects, the multiple VPN servers 120 may include VPN servers selected by the user device 102 from a list of optimal VPN servers 120 provided by the VSP control infrastructure 104 to the user device 102.

The user device 102 may install a client application associated with (e.g., provided by) the VSP control infrastructure 104. The user device 102 may utilize the client application to communicate with an application programming interface (API) and/or a processor (e.g., processing unit 110, processor 720) associated with the VSP control infrastructure 104 and with the multiple VPN servers 120. As discussed elsewhere herein, the user device 102 may utilize the client application to receive VPN services from the multiple VPN servers 120.

In some aspects, the client application may enable the user device 102 to receive information to be processed by the client application and/or by the multiple VPN servers and/or by the VSP control infrastructure 104. In an example, the client application may include a graphical user interface to receive the information via local input interfaces (e.g., touch screen, keyboard, mouse, pointer, etc.) associated with the user device 102. The information may be received via text input or via a selection from among a plurality of options (e.g., pull down menu, etc.). In some aspects, the client application may activate and/or enable, at a suitable time associated with receiving the VPN services, the graphical interface for receiving the information. For instance, the client application may cause a screen (e.g., local screen) associated with the user device 102 to display, for example, a pop-up message to request entry of the information.

Further, the client application may enable transmission of at least a portion of the information to the VSP control infrastructure 104 and/or to the multiple VPN servers. In some aspects, the client application may utilize a processing unit (e.g., processor 720) associated with the user device 102 to perform processes/operations associated with obtaining the VPN services.

As shown by reference numeral 205, the VSP control infrastructure 104 may select multiple VPN servers 120 based at least in part on VPN protocols. In some aspects, the VSP control infrastructure 104 may receive a connection request for VPN services from the user device 102. Based at least in part on receiving the connection request, the VSP control infrastructure 104 may determine the multiple VPN servers 120 for providing, at substantially the same time, the VPN services to the user device 102.

To determine the multiple VPN servers 120, the VSP control infrastructure 104 may determine various pieces of information. In an example, the VSP control infrastructure 104 may determine a current geographical location of the user device 102. Based at least in part on the current geographical location, the VSP control infrastructure 104 may determine one or more VPN protocols available for providing the VPN services to the user device 102. In some cases, an entity associated with the current geographical location may allow utilization of a first set of VPN protocols for provision of VPN services within the current geographical location while disallowing utilization of a second set of VPN protocols for provision of the VPN services within the current geographical location. In this case, the VSP control infrastructure 104 may determine that a first VPN protocol, a second VPN protocol, and a third VPN protocol are available for providing the VPN services to the user device 102 within the current geographical location. The VSP control infrastructure may determine the current geographical location of the user device 102 based at least in part on information (e.g., IP address, location information) provided by the user device in the connection request.

In another example, infrastructure associated with an ISP providing network services to the user device 102 may support utilization of a first set of VPN protocols for provision of VPN services to customers of the ISP while failing to support utilization of a second set of VPN protocols for provision of the VPN services. In this case, the VSP control infrastructure may determine that a first VPN protocol, a second VPN protocol, and a third VPN protocol are supported by the ISP and are available for providing the VPN services to the user device 102. The VSP control infrastructure 104 may identify the ISP based at least in part on information (e.g., IP address) associated with the user device and indicated by the connection request, and may identify VPN protocols supported by the ISP based at least in part on publicly available information regarding the ISP.

In yet another example, the VSP control infrastructure 104 may determine a type of network connection utilized by the user device 102 to connect to the Internet. The type of network connection may be more compatible with a first set of VPN protocols for provision of VPN services while being less compatible with a second set of VPN protocols for provision of the VPN services. In this case, the VSP control infrastructure 104 may determine that a first VPN protocol, a second VPN protocol, and a third VPN protocol are more compatible with the type of connection and are available for providing the VPN services to the user device 102. The type of network connection to be utilized by the user device after establishing parallel VPN connections (e.g., during the established parallel VPN connections) may be indicated in the connection request.

In some aspects, the type of network connection may include, for example, a switching connection or a stable connection. The switching connection may include, during the established parallel VPN connections, the user device 102 connecting to a network (e.g., Internet) via mobile technology (e.g., Code Division Multiple Access (CDMA), Global System for Mobiles (GSM), or the like) and switching to connect to the network via immobile technology (e.g., ethernet connection, Wi-Fi connection, or the like), and vice versa. The switching connection may also include the user device 102 connecting to the network using the mobile technology and moving about the environment such that the user device 102 is serviced by a plurality of cells (e.g., base stations) during the established parallel VPN connections resulting in changes in a communication parameter (e.g., IP address, port, or the like) associated with the user device 102. In a similar and/or analogous manner, the switching connection may also include the user device 102 connecting to the network using the immobile technology and moving about the environment such that the user device 102 is serviced by a plurality of immobile networks (e.g., Wi-Fi connections) during the established parallel VPN connections resulting in changes in a communication parameter (e.g., IP address, port, or the like) associated with the user device 102. The stable connection may include the user device 102 connecting to the network via the immobile technology.

In yet another example, to facilitate optimal performance, the VSP control infrastructure 104 may constantly monitor connection parameters (e.g., latency, connection speed, throughput, bandwidth, etc.) associated with the established tunnel. When a performance level associated with the connection parameters fails to satisfy a predetermined performance threshold level, the VSP control infrastructure 104 may change one or more VPN servers and/or one or more VPN protocols being utilized. In some aspects, browser applications with full set of Threat Protection features might operate with slower speeds, higher latency, and/or be blocked by a host device, and/or provide multiple CAPTCHA challenges. In this case, the VSP control infrastructure might provide a different VPN environment.

Based at least in part on determining the available VPN protocols, the VSP control infrastructure 104 may determine a list of VPN servers. The list may include, for example, a first plurality of VPN servers that are configured to utilize the first VPN protocol, a second plurality of VPN servers that are configured to utilize the second VPN protocol, and a third plurality of VPN servers that are configured to utilize the third VPN protocol. The VSP control infrastructure 104 may transmit the list of VPN servers to the user device 102.

The user device 102 may receive the list of VPN servers, and may select a VPN server from each of the plurality of VPN servers. For instance, the user device 102 may select a first VPN server from among the first plurality of VPN servers, a second VPN server from the second plurality of VPN servers, and a third VPN server from among the third plurality of VPN servers. In this case, the selected first VPN server, the selected second VPN server, and the selected third VPN server may be included in the multiple VPN servers 120.

As shown by reference numeral 210, the user device 102 and the multiple VPN servers 120 may communicate to establish, at substantially the same time (e.g., simultaneously), respective parallel VPN connections. In some aspects, at substantially the same time (e.g., simultaneously), the user device 102 may transmit to the multiple VPN servers 120 respective initiation requests to establish the respective parallel VPN connections (e.g., respective encrypted tunnels). Based at least in part on receiving the respective initiation requests, the multiple VPN servers 120 may conduct respective VPN authentications with one or more authentication servers (not shown) to authenticate the user device 102 as a device that is authorized to receive the VPN services. When the respective VPN authentications are successful, the multiple VPN servers 120 may proceed to establish the respective parallel VPN connections.

FIG. 3 is an illustration of an example 300 associated with performance-based parallel tunneling of VPN servers in a VPN, according to various aspects of the present disclosure. Example 300 shows the user device 102 having established respective parallel VPN connections (e.g., parallel tunneling) with the multiple VPN servers 120. Although example 300 shows three VPN servers, the present disclosure contemplates the user device 102 having established respective parallel VPN connections with any number of VPN servers. In some aspects, the established respective parallel VPN connections may utilize different VPN protocols such as, for example, Wireguard, IKEv2, OpenVPN, or the like. In an example, a first VPN connection (e.g., VPN connection 1) between the user device 102 and the first VPN server may utilize Wireguard, a second VPN connection (e.g., VPN connection 2) between the user device 102 and the second VPN server may utilize IKEv2, a third VPN connection (e.g., VPN connection 3) between the user device and the third VPN server may utilize OpenVPN, and so on.

In some aspects, the established respective parallel VPN connections may utilize cryptographic schemes for encryption and decryption of data communicated between the user device 102 and the multiple VPN servers 120 over the established respective parallel VPN connections. In some aspects, the respective parallel VPN connections may utilize the same cryptographic scheme. In an example, the user device 102 and the multiple VPN servers 120 may utilize the same encryption algorithm and/or the same decryption algorithm to encrypt and/or decrypt data communicated over the respective parallel VPN connections. In some aspects, the respective parallel VPN connections may utilize different cryptographic schemes. In an example, the first VPN connection (e.g., VPN connection 1) between the user device 102 and the first VPN server may utilize a first encryption algorithm and/or a first decryption algorithm, the second VPN connection (e.g., VPN connection 2) between the user device 102 and the second VPN server may utilize a second encryption algorithm and/or a second decryption algorithm, the third VPN connection (e.g., VPN connection 3) between the user device 102 and the third VPN server 120 may utilize a third encryption algorithm and/or a third decryption algorithm, and so on. In this case, the first encryption algorithm and/or the first decryption algorithm, the second encryption algorithm and/or the second decryption algorithm, and/or the third encryption algorithm and/or the third decryption algorithm may be different with respect to each other.

In some aspects, the established respective parallel VPN connections may utilize cryptographic keys for encryption and decryption of data communicated between the user device 102 and the multiple VPN servers 120 over the established respective parallel VPN connections. In some aspects, the respective parallel VPN connections may utilize the same cryptographic keys. In an example, to conserve memory and processing resources, the user device 102 may negotiate use of the same cryptographic key by the multiple VPN servers 120. In this case, the user device 102 and the multiple VPN servers 120 may utilize the same encryption key and/or the same decryption key to encrypt and/or decrypt data communicated over the respective parallel VPN connections. In some aspects, the respective parallel VPN connections may utilize different cryptographic keys. In an example, the first VPN connection (e.g., VPN connection 1) between the user device 102 and the first VPN server may utilize a first encryption key and/or a first decryption key, the second VPN connection (e.g., VPN connection 2) between the user device 102 and the second VPN server may utilize a second encryption key and/or a second decryption key, the third VPN connection (e.g., VPN connection 3) between the user device 102 and the third VPN server may utilize a third encryption key and/or a third decryption key, and so on. In this case, the first encryption key and/or the first decryption key, the second encryption key and/or the second decryption key, and/or the third encryption key and/or the third decryption key may be different with respect to each other.

Also, as shown in FIG. 3, based at least in part on the respective parallel VPN connections being established, the multiple VPN servers 120 may assign respective exit IP addresses (e.g., exit IP address 1, exit IP address 2, exit IP address 3, and so on) to the user device 102. In some aspects, the multiple VPN servers 120 may respectively select the respective exit IP addresses from among a plurality of exit IP addresses included in respective pools of exit IP addresses available to the multiple VPN servers 120. In some aspects, the multiple VPN servers 120 may utilize respective nftable network filters to assign the respective exit IP addresses. In some aspects, the VSP control infrastructure 104 (e.g., processing unit 110) may configure the multiple VPN servers 120 with respect to assigning of the respective exit IP addresses. For instance, the VSP control infrastructure 104 may configure the multiple VPN servers 120 to select and/or assign a respective exit IP addresses randomly or to select and/or assign the respective exit IP addresses sequentially. Based at least in part on assigning the respective exit IP addresses to the user device 102, the multiple VPN servers 120 may utilize the respective exit IP addresses to retrieve, from one or more host devices, data of interest that is requested by the user device 102.

As shown by reference numeral 215, the user device 102 may determine a default VPN server 120 from among the multiple VPN servers 120. In an example, the user device 102 may select the VPN server 120, from among the multiple VPN servers 120, that first completes the respective authentication with an authentication server and/or first establishes a VPN connection with the user device 102 as the default VPN server. In some aspects, the default VPN server may include a VPN server 120 from which the user device 102 may initially receive the VPN services. In an example, the user device 102 may transmit data requests to the default VPN server. In some aspects, the default VPN server may first complete the respective authentication and/or first establish the VPN connection with the user device 102 because the default VPN server may currently be an optimal VPN server to provide the VPN services to the user device 102.

A data request may include a request for the default VPN server to retrieve and provide data of interest to the user device 102. The user device 102 may transmit the data request by utilizing the client application configured and provided by the VSP control infrastructure or by utilizing a browser installed on the user device 102. The data request may be associated with initiating a connection with a website on the Internet, or may request the VPN server 120 to retrieve and provide data of interest from a host device (e.g., host device 118) that is hosting the website.

Based at least in part on establishing the respective parallel VPN connections with the multiple VPN servers 120, as shown by reference numeral 220, the user device 102 may determine a current optimal VPN server from among the multiple VPN servers 120. In some aspects, the user device 102 may determine the current optimal VPN server based at least in part on a VPN protocol that is predetermined to be optimal for various conditions associated with the user device 102. The VSP control infrastructure 104 and/or the user device 102 may predetermine optimal VPN protocols and/or optimal VPN servers prior to or at the time of the user device 102 establishing the respective parallel VPN connections with the multiple VPN servers 120.

For instance, the VSP control infrastructure 104 and/or the user device 102 may predetermine optimal VPN protocols for various conditions associated with the user device 102. In an example, in a condition where the user device 102 may request a stable VPN connection, the VSP control infrastructure 104 and/or the user device 102 may predetermine that the Open VPN protocol is optimal. In another example, in a condition where the user device 102 may request a VPN connection for securely communicating data using TCP communications and/or UDP communications, the VSP control infrastructure 104 and/or the user device 102 may predetermine that the OpenVPN protocol is optimal. In yet another example, in a condition where the user device 102 may not have user device resources (e.g., storage resources, processing resources, etc.) available for setting up OpenVPN protocol, which may involve a threshold amount of complexity and may consume a threshold amount of user device resources, the VSP control infrastructure 104 and/or the user device 102 may predetermine that the Wireguard protocol or the IKEv2 protocol is optimal.

In a condition where the user device 102 may request a fast and secure VPN connection (e.g., for streaming multimedia content, uploading and downloading a threshold amount of data, and/or playing online games while interacting with other online players), the VSP control infrastructure 104 and/or the user device 102 may predetermine that the IKEv2 protocol is optimal. Similarly, in a condition where the user device 102 may utilize different technologies to access the Internet (e.g., may switch from stationary technology to mobile technology and vice versa) during the established VPN connection, the VSP control infrastructure 104 and/or the user device 102 may predetermine that the IKEv2 protocol is optimal. In another example, in a condition where the user device 102 indicates that the user device is to utilize a first operating system (e.g., the IOS operating system, the Mac operating system, etc.) to which the IKEv2 protocol may be native, during the established parallel VPN connections, the VSP control infrastructure 104 and/or the user device 102 may predetermine that the IKEv2 protocol is optimal. In yet another example, in a condition where the user device 102 indicates that the user device is to utilize a second operating system (e.g., the Android operating system), for which the IKEv2 protocol may not be optimal, the VSP control infrastructure 104 and/or the user device 102 may predetermine that the OpenVPN protocol or the Wireguard protocol is optimal.

In an example, in a condition where the user device 102 may request a lean VPN protocol for enabling faster VPN connections, the VSP control infrastructure 104 and/or the user device 102 may determine that the Wireguard protocol is optimal. In another example, in a condition where the user device 102 may include a smart device (e.g., an Internetof-things (IoT) device) and may communicate ultra-reliable low latency (URLLC) data, the VSP control infrastructure 104 and/or the user device 102 may determine that the Wireguard protocol is optimal. In yet another example, in a condition where the user device 102 may request enhanced anonymity and/or enhanced mitigation with respect to private information associated with the user device 102 becoming compromised, the VSP control infrastructure 104 and/or the user device 102 may determine that the OpenVPN protocol or the IKEv2 protocol is optimal.

In some aspects, the VSP control infrastructure 104 and/or the user device 102 may predetermine the optimal VPN protocol based at least in part on the ISP that is providing internet-based services to the user device 102. For instance, in a condition where a first ISP may be providing internet-based services to the user device 102 during the established VPN connection, the VSP control infrastructure 104 and/or the user device 102 may determine a VPN protocol that is compatible with infrastructure associated with the first ISP as the optimal VPN protocol. Similarly, when the VSP control infrastructure 104 determines that a second ISP may be providing internet-based services to the user device 102 during the established VPN connection, the VSP control infrastructure may determine a VPN protocol compatible with infrastructure associated with the second ISP as the optimal VPN protocol. In some aspects, such predetermination of the optimal VPN protocol by the VSP control infrastructure 104 and/or the user device 102 may be based at least in part on previously observed performance of different VPN protocols with infrastructure associated with different ISPs.

In some aspects, the VSP control infrastructure 104 and/or the user device 102 may predetermine the optimal VPN protocol based at least in part on one or more dynamic conditions associated with the user device 102. The one or more dynamic conditions may include, for example, an indicated speed of a network connection to be utilized by the user device 102 during the established VPN connection. For instance, in a condition where the speed of the network connection during the established parallel VPN connections fails to satisfy a threshold network speed (e.g., speed of network connection is greater than or equal to the threshold network speed), the VSP control infrastructure 104 and/or the user device 102 may predetermine that a fast VPN protocol such as the Wireguard protocol is optimal. Similarly, in a condition where the speed of the network connection during the established parallel VPN connections satisfies the threshold network speed (e.g., speed of network connection is less than the threshold network speed), the VSP control infrastructure may determine that the OpenVPN protocol is optimal. In a similar and/or analogous manner, additional dynamic conditions such as, for example, latency, a threshold amount of CAPTCHA challenges, throughput, etc. may be considered.

In some aspects, the present disclosure contemplates the VSP control infrastructure 104 and/or the user device 102 to consider a combination of conditions while predetermining the optimal VPN protocol.

To determine the current optimal VPN server, the user device 102 may determine the optimal VPN protocol for providing the VPN services during current (e.g., real-time) conditions associated with the user device 102. Further, the user device 102 may determine the VPN server, from among the multiple VPN servers 120, that is utilizing the determined optimal VPN protocol as the current optimal VPN server. When the current optimal VPN server is different from the default VPN server (or a previously determined optimal VPN server), the user device may start requesting VPN services from the optimal VPN server instead of from the default VPN server (or the previously determined optimal VPN server).

In some aspects, the user device 102 may determine the optimal VPN server periodically. A period associated with determining the current optimal VPN server may be different based at least in part on a technology utilized by the user device 102 to access a network (e.g., Internet). For instance, the user device 102 may be configured to utilize a plurality of technologies including stationary technology (e.g., Wi-Fi) or mobile technology (e.g., LTE, CDMA, GSM, etc.) to access the network. When the user device 102 is utilizing the stationary technology, the user device 102 may determine the current optimal VPN server at a first periodicity (e.g., every 60 minutes, every 120 minutes, etc.). When the user device 102 is utilizing the mobile technology, the user device 102 may determine the current optimal VPN server and a second periodicity (e.g., every 180 minutes, every 240 minutes, etc.). In this way, the user device 102 may enable conservation of resources (e.g., battery life) while using the mobile technology.

In some aspects, the user device 102 may determine the current optimal VPN server based at least in part on determining a change in the technology utilized by the user device 102 to access a network (e.g., Internet). In an example, while utilizing the stationary technology, the user device 102 may change its location and begin utilizing the mobile technology to access the network, or vice versa. In this case, based at least in part on determining a change in the technology utilized by the user device 102 to access the network, the user device 102 may determine the current optimal VPN server. In this way, the user device 102 may receive the VPN services from a VPN server that may be configured, and therefore more suitable, to provide VPN services for a given technology for accessing the network.

In some aspects, based at least in part on determining the optimal VPN protocol and/or the optimal VPN server for the current conditions, the user device 102 may establish a backup parallel VPN connection with a backup VPN server that is also configured to utilize the optimal VPN protocol. In an example, the user device may select the backup VPN server from the list of VPN servers received from the VSP control infrastructure 104. Based at least in part on selecting the backup VPN server, the user device 102 may transmit an initiation request to the backup VPN server. The backup VPN server may conduct an authentication of the user device 102 as an authorized device for receiving the VPN services, and based at least in part on a successful authentication, the user device 102 and the backup VPN server may establish a backup parallel VPN connection that utilizes the optimal VPN protocol. In this case, the backup VPN server may be included in the multiple VPN servers 120. In a situation where the current optimal VPN server becomes unavailable, the user device 102 may utilize the backup VPN server to receive the VPN services. In this way, the VSP control infrastructure 104 and the user device 102 may enable provision of the VPN services by one or more VPN servers utilizing the optimal protocol for current conditions associated with the user device 102. The user device 102 may dynamically change the backup VPN server based at least in part on changes in the conditions associated with the user device 102.

As shown by reference numeral 230, the user device 102 may determine connectivity of the respective parallel VPN connections. In some aspects, during the respective parallel VPN connections (e.g., while the respective parallel VPN connections are active and/or maintained), the user device 102 may verify, in real time, connectivity with each of the multiple VPN servers 120 by determining statuses of each of the respective parallel VPN connections. In some aspects, the user device 102 may transmit, at substantially the same time, respective query pings to each of the multiple VPN servers 120 over the respective parallel VPN connections, and may receive response pings from each of the multiple VPN servers 120 over the respective VPN connections to verify the connectivity.

In some aspects, the user device 102 may verify the connectivity periodically. A period associated with verifying the connectivity may be different based at least in part on the technology utilized by the user device 102 to access the network (e.g., Internet). For instance, the user device 102 may be configured to utilize a plurality of technologies including stationary technology (e.g., Wi-Fi) or mobile technology (e.g., LTE, CDMA, GSM, etc.) to access the network. When the user device 102 is utilizing the stationary technology, the user device 102 may verify the connectivity at a first periodicity (e.g., every 30 seconds, every 60 seconds, every 2 minutes, etc.). When the user device 102 is utilizing the mobile technology, the user device 102 may verify the connectivity at a second periodicity (e.g., every 5 minutes, every 10 minutes, every 15 minutes, every 30 minutes, etc.). In this way, the user device 102 may enable conservation of resources (e.g., battery life) while using the mobile technology.

In some aspects, the user device 102 may verify the connectivity based at least in part on determining a change in the technology utilized by the user device 102 to access the network (e.g., Internet). In an example, while utilizing the stationary technology, the user device 102 may change its location and begin utilizing the mobile technology to access the network, or vice versa. In this case, based at least in part on determining a change in the technology utilized by the user device 102 to access the network, the user device 102 may verify the connectivity. In this way, the user device 102 may ensure that the change in technology has not resulted in a VPN connection being terminated.

In some aspects, when the user device 102 fails to receive a response ping, the user device 102 may determine that a respective VPN connection, from among the established parallel VPN connections, has been terminated. Example reasons for a termination may include, for example, change in the technology to access the Internet, a VPN server becoming unavailable, etc. In this case, the user device 102 may dynamically adjust the parallel tunneling with the virtual private network servers. In an example, the user device 102 may select another VPN server from the list of optimal VPN servers provided by the VSP control infrastructure 104, may transmit an initiation request to the selected VPN server, and may establish a respective parallel VPN connection with a selected VPN server.

In this way, by establishing multiple parallel VPN connections (e.g., parallel encrypted tunnels) with the multiple VPN servers based at least in part on VPN protocols and/or by periodically determining the optimal VPN server based at least in part on the optimal VPN protocol, the user device may continue to optimally receive the VPN services even when conditions associated with the user device change without terminating established VPN connections and/or without establishing new VPN connections. As a result, efficient utilization of user device resources (e.g., processing resources, memory resources, power consumption resources, battery life, or the like) and VPN resources (computational resources, network bandwidth, management resources, processing resources, memory resources, or the like) may be enabled.

As indicated above, FIGS. 2 and 3 are provided as examples. Other examples may differ from what is described with regard to FIGS. 2 and 3.

FIG. 4 is an illustration of an example process 400 associated with performance-based parallel tunneling of VPN servers in a VPN, according to various aspects of the present disclosure. In some aspects, the process 400 may be performed by memories (e.g., memory 730) and/or processors (e.g., processor 720) associated with a VPN infrastructure device (e.g., VSP control infrastructure 104) and/or a user device (e.g., user device 102 executing a client application). As shown by reference numeral 410, process 400 includes determining, by a VPN infrastructure device, a first VPN protocol and a second VPN protocol that are available for providing VPN services to a user device, the first VPN protocol being different from the second VPN protocol. For instance, the VPN infrastructure device may utilize the associated memory and/or processor to determine a first VPN protocol and a second VPN protocol that are available for providing VPN services to a user device, the first VPN protocol being different from the second VPN protocol, as discussed elsewhere herein.

As shown by reference numeral 420, process 400 includes transmitting, by the VPN infrastructure device to the user device, a list indicating a first plurality of VPN servers configured to utilize the first VPN protocol and a second plurality of VPN servers configured to utilize the second VPN protocol. For instance, the VPN infrastructure device may utilize an associated communication interface (e.g., communication interface 770) with the associated memory and/or processor to transmit, to the user device, a list indicating a first plurality of VPN servers configured to utilize the first VPN protocol and a second plurality of VPN servers configured to utilize the second VPN protocol, as discussed elsewhere herein.

As shown by reference numeral 430, process 400 includes establishing, by the user device at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol. For instance, the user device may utilize the associated memory and/or processor to establish, at substantially the same time, a first parallel VPN connection with a first VPN server from among the first plurality of VPN servers, the first VPN connection configured to utilize the first VPN protocol, and a second parallel VPN connection with a second VPN server from among the second plurality of VPN servers, the second VPN connection configured to utilize the second VPN protocol, as discussed elsewhere herein.

Process 400 may include additional aspects, such as any single aspect or any combination of aspects described below and/or in connection with one or more other processes described elsewhere herein.

In a first aspect, in process 400, the first VPN protocol or the second VPN protocol includes OpenVPN protocol, Wireguard protocol, or IKEv2 protocol.

In a second aspect, alone or in combination with the first aspect, in process 400, determining the first VPN protocol and the second VPN protocol includes the VPN infrastructure device identifying the first VPN protocol and the second VPN protocol based at least in part on a current geographical location of the user device.

In a third aspect, alone or in combination with the first through second aspects, in process 400, establishing the first parallel VPN connection and the second parallel VPN connection includes the user device transmitting, at substantially the same time, a first initiation request to the first VPN server requesting establishment of the first parallel VPN connection and a second initiation request to the second VPN server requesting establishment of the second parallel VPN connection.

In a fourth aspect, alone or in combination with the first through third aspects, in process 400, the first parallel VPN connection may utilize a first cryptographic scheme for encrypting data communication between the user device and the first VPN server, and the second parallel VPN connection may utilize a second cryptographic scheme for encrypting data communication between the user device and the second VPN server, the first cryptographic scheme being different from the second cryptographic scheme.

In a fifth aspect, alone or in combination with the first through fourth aspects, process 400 may include determining, by the user device based at least in part on the first VPN protocol or the second VPN protocol being predetermined as an optimal protocol for the user device, an optimal VPN server from among the first VPN server and the second VPN server for providing the VPN services to the user device.

In a sixth aspect, alone or in combination with the first through fifth aspects, process 400 may include determining, by the user device, a default VPN server from among the first VPN server and the second VPN server for providing the VPN services to the user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with performance-based parallel tunneling of VPN servers in a VPN, according to various aspects of the present disclosure. In some aspects, the process 500 may be performed by an associated memory (e.g., memory 730) and/or an associated processor (e.g., processor 720) related to a VPN infrastructure device (e.g., VSP control infrastructure 104). As shown by reference numeral 510, process 500 includes receiving, by a VPN infrastructure device from a user device, a connection request for requesting VPN services. For instance, the VPN infrastructure device may utilize an associated communication interface (e.g., communication interface 770) with the associated memory and/or processor to receive, from a user device, a connection request for requesting VPN services, as discussed elsewhere herein.

As shown by reference numeral 520, process 500 includes determining, by the VPN infrastructure device based at least in part on receiving the connection request, first and second VPN protocols that are available for providing the VPN services to the user device, the first VPN protocol being different from the second VPN protocol. For instance, the VPN infrastructure device may utilize the associated memory and/or processor to determine, based at least in part on receiving the connection request, first and second VPN protocols that are available for providing the VPN services to the user device, the first VPN protocol being different from the second VPN protocol, as discussed elsewhere herein.

As shown by reference numeral 530, process 500 includes determining, by the VPN infrastructure device based at least in part on determining the first and second VPN protocols, a list indicating a first plurality of VPN servers configured to utilize the first VPN protocol and a second plurality of VPN servers configured to utilize the second VPN protocol. For instance, the VPN infrastructure device may utilize the associated memory and/or processor to determine, based at least in part on determining the first and second VPN protocols, a list indicating a first plurality of VPN servers configured to utilize the first VPN protocol and a second plurality of VPN servers configured to utilize the second VPN protocol, as discussed elsewhere herein.

As shown by reference numeral 540, process 500 includes transmitting, by the VPN infrastructure device to the user device, the list indicating the first plurality of VPN servers and the second plurality of VPN servers. For instance, the VPN infrastructure device may utilize the associated communication interface, memory, and processor to transmit, to the user device, the list indicating the first plurality of VPN servers and the second plurality of VPN servers, as discussed elsewhere herein.

As shown by reference numeral 550, process 500 includes enabling, by the VPN infrastructure device, a first VPN server from among the first plurality of VPN servers and a second VPN server from among the second plurality of VPN servers to provide, at substantially the same time, the VPN services to the user device, the first VPN server utilizing the first VPN protocol and the second VPN server utilizing the second VPN protocol. For instance, the VPN infrastructure device may utilize the associated memory and/or processor to enable a first VPN server from among the first plurality of VPN servers and a second VPN server from among the second plurality of VPN servers to provide, at substantially the same time, the VPN services to the user device, the first VPN server utilizing the first VPN protocol and the second VPN server utilizing the second VPN protocol, as discussed elsewhere herein. In some aspects, the VPN infrastructure device may provide entry IP addresses associated with the first and second VPN servers to the user device to enable the user device to establish the parallel VPN connections.

Process 500 may include additional aspects, such as any single aspect or any combination of aspects described below and/or in connection with one or more other processes described elsewhere herein.

In a first aspect, in process 500, wherein the first VPN protocol or the second VPN protocol includes OpenVPN protocol, Wireguard protocol, or IKEv2 protocol.

In a second aspect, alone or in combination with the first aspect, in process 500, determining the first VPN protocol and the second VPN protocol includes the VPN infrastructure device identifying the first VPN protocol and the second VPN protocol based at least in part on a current geographical location of the user device.

In a third aspect, alone or in combination with the first through second aspects, in process 500, determining the first VPN protocol and the second VPN protocol includes the VPN infrastructure device identifying VPN protocols supported by a network service provider providing network services to the user device.

In a fourth aspect, alone or in combination with the first through third aspects, in process 500, determining the first VPN protocol and the second VPN protocol includes the VPN infrastructure device identifying the first VPN protocol and the second VPN protocol based at least in part on a type of network connection to be utilized by the user device after establishing parallel VPN connections with the first VPN server and the second VPN server.

In a fifth aspect, alone or in combination with the first through fourth aspects, in process 500, enabling the first VPN server and the second server to provide the VPN services includes the VPN infrastructure device determining that the user device has selected the first VPN server from the first plurality of VPN servers and the second VPN server from the second plurality of VPN servers.

In a sixth aspect, alone or in combination with the first through fifth aspects, in process 500, the first parallel VPN connection may utilize a first cryptographic scheme for encrypting data communication between the user device and the first VPN server, and the second parallel VPN connection may utilize a second cryptographic scheme for encrypting data communication between the user device and the second VPN server, the first cryptographic scheme being different from the second cryptographic scheme.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with performance-based parallel tunneling of VPN servers in a VPN, according to various aspects of the present disclosure. In some aspects, the process 600 may be performed by an associated memory (e.g., memory 730) and/or an associated processor (e.g., processor 720) related to a user device (e.g., user device 102) based at least in part on executing a client application provided by a VSP control infrastructure. As shown by reference numeral 610, process 600 includes transmitting, by a user device to a VPN infrastructure device, a connection request for requesting VPN services. For instance, the user device may utilize an associated communication interface (e.g., communication interface 770) with the associated memory and/or processor to transmit, to a VPN infrastructure device, a connection request for requesting VPN services, as discussed elsewhere herein.

As shown by reference numeral 620, process 600 includes receiving, by the user device from the VPN infrastructure device based at least in part on transmitting the connection request, a list indicating a first plurality of VPN servers configured to utilize a first VPN protocol and a second plurality of VPN servers configured to utilize a second VPN protocol, the first VPN protocol being different from the second VPN protocol. For instance, the user device may utilize the associated communication interface, memory, and/or processor to receive, from the VPN infrastructure device based at least in part on transmitting the connection request, a list indicating a first plurality of VPN servers configured to utilize a first VPN protocol and a second plurality of VPN servers configured to utilize a second VPN protocol, the first VPN protocol being different from the second VPN protocol, as discussed elsewhere herein.

As shown by reference numeral 630, process 600 includes transmitting, by the user device at substantially the same time, a first initiation request to request establishment of a first parallel VPN connection with a first VPN server from among the first plurality of VPN servers, and a second initiation request to request establishment of a second parallel VPN connection with a second VPN server from among the second plurality of VPN servers. For instance, the user device may utilize the associated communication interface, memory, and/or processor to transmit, at substantially the same time, a first initiation request to request establishment of a first parallel VPN connection with a first VPN server from among the first plurality of VPN servers, and a second initiation request to request establishment of a second parallel VPN connection with a second VPN server from among the second plurality of VPN servers, as discussed elsewhere herein.

As shown by reference numeral 640, process 600 includes establishing, by the user device based at least in part on transmitting the first and second initiation requests, the first parallel VPN connection with the first VPN server and the second parallel VPN connection with the second VPN server. For instance, the user device may utilize the associated memory and/or processor to establish, based at least in part on transmitting the first and second initiation requests, the first parallel VPN connection with the first VPN server and the second parallel VPN connection with the second VPN server, as discussed elsewhere herein.

Process 600 may include additional aspects, such as any single aspect or any combination of aspects described below and/or in connection with one or more other processes described elsewhere herein.

In a first aspect, wherein, in process 600, wherein the first VPN protocol or the second VPN protocol includes OpenVPN protocol, Wireguard protocol, or IKEv2 protocol.

In a second aspect, alone or in combination with the first aspect, process 600 may include determining, based at least in part on the first VPN protocol or the second VPN protocol being predetermined as an optimal protocol for the user device, an optimal VPN server from among the first VPN server and the second VPN server for providing the VPN services to the user device.

In a third aspect, alone or in combination with the first through second aspects, in process 600, the first parallel VPN connection may utilize a first cryptographic scheme for encrypting data communication between the user device and the first VPN server, and the second parallel VPN connection may utilize a second cryptographic scheme for encrypting data communication between the user device and the second VPN server, the first cryptographic scheme being different from the second cryptographic scheme.

In a fourth aspect, alone or in combination with the first through third aspects, process 600 may include utilizing a single cryptographic key for encryption and decryption of data communicated over the first parallel VPN connection and over the second parallel VPN connection.

In a fifth aspect, alone or in combination with the first through fourth aspects, process 600 may include determining, by the user device in real time, an optimal VPN server for providing the VPN services from among the first VPN server and the second VPN server.

In a sixth aspect, alone or in combination with the first through fifth aspects, process 600 may include determining, by the user device, a default VPN server for providing the VPN services from among the first VPN server and the second VPN server.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with performance-based parallel tunneling of VPN servers in a VPN, according to various aspects of the present disclosure. In some aspects, the example devices 700 may form part of or implement the systems, environments, infrastructures, components, devices or the like described elsewhere herein (e.g., VPN server, the VSP control infrastructure, etc.) and may be utilized for performing the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based at least in part on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A virtual private network (VPN) infrastructure device, comprising:
   a memory; and
   a processor communicatively coupled to the memory, the memory and the processor being configured to:
   receive, from a user device, a connection request for requesting VPN services;
   determine, based at least in part on receiving the connection request, first and second VPN protocols that are available for providing the VPN services to the user device, the first VPN protocol being different from the second VPN protocol and the first VPN protocol or the second VPN protocol including Open VPN protocol, Wireguard protocol, or IKEv2 protocol;
   determine, based at least in part on determining the first and second VPN protocols, a list indicating a first plurality of VPN servers configured to utilize the first VPN protocol and a second plurality of VPN servers configured to utilize the second VPN protocol;
   transmit, to the user device, the list indicating the first plurality of VPN servers and the second plurality of VPN servers;
   enable a first VPN server from among the first plurality of VPN servers to establish a first parallel VPN connection with the user device and a second VPN server from among the second plurality of VPN servers to establish a second parallel VPN connection with the user device at the same time, the first VPN server utilizing the first VPN protocol and the second VPN server utilizing the second VPN protocol; and
   enable the user device to determine an optimal VPN server, from among the first VPN server and the second VPN server, based at least in part on periodically determining the first VPN protocol or the second VPN protocol as an optimal protocol, whereby the user device is enabled to continuously receive the VPN services from the optimal VPN server without terminating the established parallel VPN connections and without establishing a new VPN connection.

2. The VPN infrastructure device of claim 1, wherein the memory and the processor are configured to enable the user device to periodically determine the optimal protocol based at least in part on factoring a stability of the VPN connection, or a security associated with the VPN connection, or a technology utilized by the user device to access the Internet.

3. The VPN infrastructure device of claim 1, wherein, to determine the first VPN protocol and the second VPN protocol, the memory and the processor are configured to identify the first VPN protocol and the second VPN protocol based at least in part on a current geographical location of the user device.

4. The VPN infrastructure device of claim 1, wherein, to determine the first VPN protocol and the second VPN protocol, the memory and the processor are configured to identify VPN protocols supported by a network service provider providing network services to the user device.

5. The VPN infrastructure device of claim 1, wherein, to determine the first VPN protocol and the second VPN protocol, the memory and the processor are configured to identify the first VPN protocol or the second VPN protocol based at least in part on a type of network connection to be utilized by the user device after establishing parallel VPN connections with the first VPN server and the second VPN server.

6. The VPN infrastructure device of claim 1, wherein, to enable the first VPN server and the second server to provide the VPN services, the memory and the processor are configured to determine that the user device has selected the first VPN server from the first plurality of VPN servers and the second VPN server from the second plurality of VPN servers.

7. The VPN infrastructure device of claim 1, wherein the first parallel VPN connection utilizes a first cryptographic scheme for encrypting data communication between the user device and the first VPN server, and the second parallel VPN connection utilizes a second cryptographic scheme for encrypting data communication between the user device and the second VPN server, the first cryptographic scheme being different from the second cryptographic scheme.

8. A method in a virtual private network (VPN) environment, the method comprising:
   receiving, by a VPN infrastructure device from a user device, a connection request for requesting VPN services;

determining, by the VPN infrastructure device based at least in part on receiving the connection request, first and second VPN protocols that are available for providing the VPN services to the user device, the first VPN protocol being different from the second VPN protocol and the first VPN protocol or the second VPN protocol including Open VPN protocol, Wireguard protocol, or IKEv2 protocol;

determining, by the VPN infrastructure device based at least in part on determining the first and second VPN protocols, a list indicating a first plurality of VPN servers configured to utilize the first VPN protocol and a second plurality of VPN servers configured to utilize the second VPN protocol;

transmitting, by the VPN infrastructure device to the user device, the list indicating the first plurality of VPN servers and the second plurality of VPN servers;

enabling, by the VPN infrastructure device, a first VPN server from among the first plurality of VPN servers to establish a first parallel VPN connection with the user device and a second VPN server from among the second plurality of VPN servers to establish a second parallel VPN connection with the user device at the same time, the first VPN server utilizing the first VPN protocol and the second VPN server utilizing the second VPN protocol; and enabling the user device to determine an optimal VPN server, from among the first VPN server and the second VPN server, based at least in part on periodically determining the first VPN protocol or the second VPN protocol as an optimal protocol, whereby the user device is enabled to continuously receive the VPN services from the optimal VPN server without terminating the established parallel VPN connections and without establishing a new VPN connection.

9. The method of claim 8, further comprising:
enabling the user device to periodically determine the optimal protocol based at least in part on factoring a stability of the VPN connection, or a security associated with the VPN connection, or a technology utilized by the user device to access the Internet.

10. The method of claim 8, wherein determining the first VPN protocol and the second VPN protocol includes the VPN infrastructure device identifying the first VPN protocol and the second VPN protocol based at least in part on a current geographical location of the user device.

11. The wherein determining the first VPN protocol and the second VPN protocol includes the VPN infrastructure device identifying VPN protocols supported by a network service provider providing network services to the user device.

12. The method of claim 8, wherein determining the first VPN protocol and the second VPN protocol includes the VPN infrastructure device identifying the first VPN protocol or the second VPN protocol based at least in part on a type of network connection to be utilized by the user device after establishing parallel VPN connections with the first VPN server and the second VPN server.

13. The method of claim 8, wherein enabling the first VPN server and the second server to provide the VPN services includes the VPN infrastructure device determining that the user device has selected the first VPN server from the first plurality of VPN servers and the second VPN server from the second plurality of VPN servers.

14. The method of claim 8, wherein the first parallel VPN connection utilizes a first cryptographic scheme for encrypting data communication between the user device and the first VPN server, and the second parallel VPN connection utilizes a second cryptographic scheme for encrypting data communication between the user device and the second VPN server, the first cryptographic scheme being different from the second cryptographic scheme.

15. A non-transitory computer-readable medium configured to store instructions, which when executed by a processor associated with a virtual private network (VPN) infrastructure device, configure the processor to:

receive, from a user device, a connection request for requesting VPN services;

determine, based at least in part on receiving the connection request, first and second VPN protocols that are available for providing the VPN services to the user device, the first VPN protocol being different from the second VPN protocol and the first VPN protocol or the second VPN protocol including OpenVPN protocol, Wireguard protocol, or IKEv2 protocol;

determine, based at least in part on determining the first and second VPN protocols, a list indicating a first plurality of VPN servers configured to utilize the first VPN protocol and a second plurality of VPN servers configured to utilize the second VPN protocol;

transmit, to the user device, the list indicating the first plurality of VPN servers and the second plurality of VPN servers;

enable a first VPN server from among the first plurality of VPN servers to establish a first parallel VPN connection with the user device and a second VPN server from among the second plurality of VPN servers to establish a second parallel VPN connection with the user device at the same time, the first VPN server utilizing the first VPN protocol and the second VPN server utilizing the second VPN protocol; and enable the user device to determine an optimal VPN server, from among the first VPN server and the second VPN server, based at least in part on periodically determining the first VPN protocol or the second VPN protocol as an optimal protocol, whereby the user device is enabled to continuously receive the VPN services from the optimal VPN server without terminating the established parallel VPN connections and without establishing a new VPN connection.

16. The non-transitory computer-readable medium of claim 15, wherein the processor is configured to enable the user device to periodically determine the optimal protocol based at least in part on factoring a stability of the VPN connection, or a security associated with the VPN connection, or a technology utilized by the user device to access the Internet.

17. The non-transitory computer-readable medium of claim 15, wherein, to determine the first VPN protocol and the second VPN protocol, the processor is configured to identify the first VPN protocol and the second VPN protocol based at least in part on a current geographical location of the user device.

18. The non-transitory computer-readable medium of claim 15, wherein, to determine the first VPN protocol and the second VPN protocol, the processor is configured to identify VPN protocols supported by a network service provider providing network services to the user device.

19. The non-transitory computer-readable medium of claim 15, wherein, to determine the first VPN protocol and the second VPN protocol, the processor is configured to identify the first VPN protocol or the second VPN protocol based at least in part on a type of network connection to be utilized by the user device after establishing parallel VPN connections with the first VPN server and the second VPN server.

20. The non-transitory computer-readable medium of claim 15, wherein, to enable the first VPN server and the second server to provide the VPN services, the processor is configured to determine that the user device has selected the first VPN server from the first plurality of VPN servers and the second VPN server from the second plurality of VPN servers.

* * * * *